(12) United States Patent
Olainu

(10) Patent No.: US 11,687,517 B2
(45) Date of Patent: Jun. 27, 2023

(54) SYSTEM AND METHOD FOR UPDATING A POLICY OBJECT

(71) Applicant: Hippo Analytics Inc., Palo Alto, CA (US)

(72) Inventor: Adrian Olainu, Sunnyvale, CA (US)

(73) Assignee: Hippo Analytics Inc., Palo Alto, CA (US)

( * ) Notice: Subject to any disclaimer, the term of this patent is extended or adjusted under 35 U.S.C. 154(b) by 67 days.

(21) Appl. No.: 17/069,503

(22) Filed: Oct. 13, 2020

(65) Prior Publication Data

US 2022/0114159 A1    Apr. 14, 2022

(51) Int. Cl.
*G06F 16/23* (2019.01)
*G06F 16/21* (2019.01)
*G06F 16/22* (2019.01)

(52) U.S. Cl.
CPC ........ *G06F 16/2365* (2019.01); *G06F 16/212* (2019.01); *G06F 16/2264* (2019.01)

(58) Field of Classification Search
CPC . G06F 16/2365; G06F 16/212; G06F 16/2264
See application file for complete search history.

(56) References Cited

U.S. PATENT DOCUMENTS

| 8,620,959 B1* | 12/2013 | Denton, III | G06F 16/25 703/3 |
| 2008/0059413 A1* | 3/2008 | Evans | G06Q 10/06 |
| 2009/0248727 A1* | 10/2009 | Hughes | G06F 16/213 707/999.102 |
| 2015/0142804 A1* | 5/2015 | Sabbouh | G06F 9/4493 707/737 |

* cited by examiner

*Primary Examiner* — Alex Gofman
*Assistant Examiner* — Erich Alexander Fischer
(74) *Attorney, Agent, or Firm* — Schwegman Lundberg & Woessner, P.A.

(57) ABSTRACT

A computer system stores a database model of an object based on a plurality of updates to the object. Each update indicates a bound status of the update, a transaction date of the update, an effective date of the update, and a value of an attribute in the update. The computer system forms a view model of the object based on the database model of the object by reconstructing values of the attributes of the object from the plurality of updates with immutable bound statuses.

20 Claims, 10 Drawing Sheets

SYSTEM AND METHOD FOR UPDATING A POLICY OBJECT

TECHNICAL FIELD

The subject matter disclosed herein generally relates to a computer for updating an object in a memory and, in particular, to a computer system and method that validates updates to attributes to the object, and construct a view of the updated object.

BACKGROUND

A programming object can be used to store a sequence of events such as updates to attributes of the objects over time. However, multi-dimensional attributes that depend on other attributes do add a level of complexity when the object is to be updated because the value of an attribute can depend on the value of another attribute. As such, a programmer that seeks to access a snapshot of the programming object at a specific point in time may have to manually reconstruct the programming object based on the values of the attributes at the specific point in time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
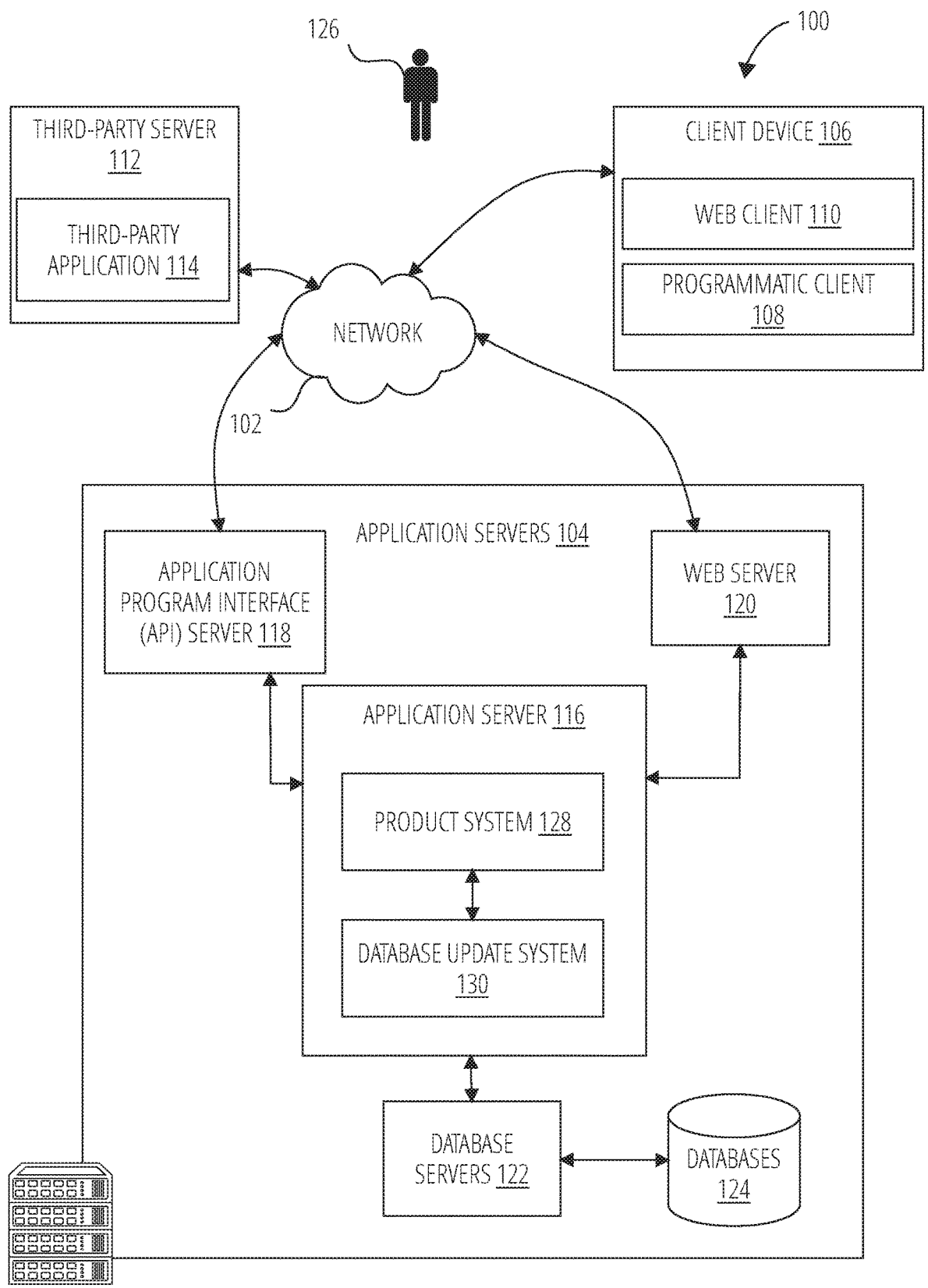
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Updates to objects in a database can be difficult given the large amount of objects, attributes, and inter-dimensionality of some values of the objects. The present application describes a system and method for updating attributes of an object based on a model that only specifies field of changes in updates without having to copy or respecify entire data from previous entries. The system can be implemented as an API that performs changes to the object stored in a database.

In one example embodiment, a computer system forms a database model of an object based on a plurality of updates to the object. Each update indicates a bound status of the update, a transaction date of the update, an effective date of the update, and a value of an attribute in the update, the bound status indicating one of a mutable or immutable commitment of a corresponding update to the object. The computer system forms a view model of the object based on the database model of the object by reconstructing values of the attributes of the object from the plurality of updates with immutable bound statuses. The computer system receives a request to replace a first value of a first attribute of the object with a second value of the first attribute of the object. The second value of the first attribute is validated, based on a rule, against a third value of a second attribute of a latest version of the object that is formed from the view model of the object with immutable bound status updates. The rule indicates an attribute value relationship rule between the first attribute and the second attribute. In response to validating the request, the computer system forms a new update indicating the second value of the first attribute. The computer system updates the object with the new update.

As a result, one or more of the methodologies described herein facilitate solving the technical problem of updating an object without having to specify all attributes in an update to the object. Furthermore, changes to the object traditionally involve a team of programmers searching for the pertinent object and manually updating values of each attributes of the object. As such, one or more of the methodologies described herein may obviate a need for certain efforts or computing resources that otherwise would be involved in specifying every attributes of an object and requiring user intervention to update values of objects. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 110. A web client 110 (e.g., a browser) and a programmatic client 108 (e.g., an "app") are hosted and execute on the web client 110.

An Application Program Interface (API) server 118 and a web server 120 provide respective programmatic and web interfaces to application servers 104. A specific application server 116 hosts a product system 128 and a database update system 130, which each includes components, modules and/or applications. The product system 128 generates a product information based on input from a user of the product system 128. For example, the product system 128 enables an administrator to provide or quote an insurance policy based on parameters/information provided a customer. The database update system 130 enables an administrator to make changes to the policy based on updated information provided at the product system 128.

The web client 110 communicates with the application server 116 via the web interface supported by the web server 120. Similarly, the programmatic client 108 communicates with the application server 116 via the programmatic interface provided by the Application Program Interface (API) server 118.

The application server 116 is shown to be communicatively coupled to database servers 122 that facilitates access to an information storage repository or databases 124. In an example embodiment, the databases 124 includes storage devices that store information to be published and/or processed by the database update system 130.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. In another example, the third-party server 112 stores the product system 128 or another application that interfaces with the database update system 130.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
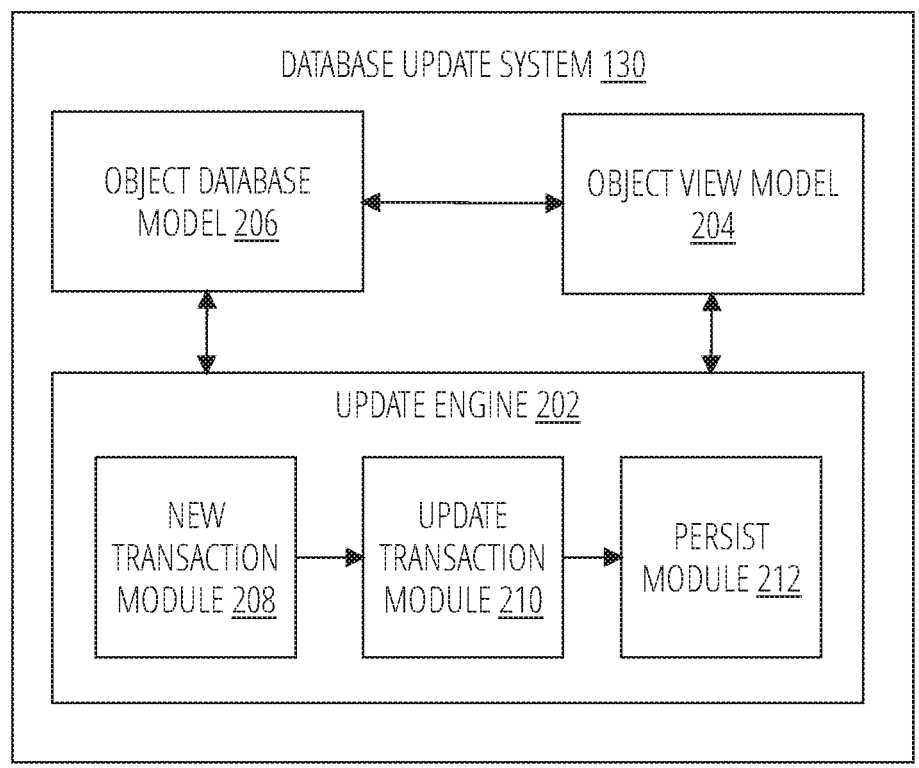
FIG. 2 illustrates a database update system in accordance with one example embodiment.

FIG. 2 illustrates a database update system 130 in accordance with one example embodiment. The database update system 130 includes an object database model 206, an object view model 204, and an update engine 202.

The object database model 206 forms a database model for each object. For example, each object is defined based on a plurality of sequential updates that identify the field of change (e.g., value change of an attribute and attribute, transaction date, effective date). As such, the entire data for every attribute does not need to be copied or replicated in the object in order to reflect current values of the object.

The following pseudo-code illustrates an example of updates to a policy object:

| Policy DB model |
|---|
| policy = { <br>   updates = [ <br>     { <br>       bound: true, <br>       ts: 0, <br>       effective_date: 0, <br>       data: { <br>         discount_1: false, <br>         discount_2: false, <br>         property_data: { <br>           address: { <br>             city, <br>           }, <br>           rce: 100000, <br>         }, <br>         cov_a: 100000, <br>         premium: { <br>           total: 1,000, <br>         } <br>       } <br>     }, <br>     { <br>       bound: true, <br>       ts: 183, <br>       effective_date: 183, <br>       data: { <br>         discount_2: true, <br>       } <br>     }, <br>     { <br>       bound: true, <br>       ts: 200, <br>       effective_date: 0, <br>       data: { <br>         cc_token: 'abc' <br>       } <br>     }, <br>     { <br>       bound: true, <br>       ts: 240, <br>       effective_date: 240, <br>       data: { <br>         property_data: { <br>           rce: 50,000 <br>         }, <br>         cov_a: 75000, <br>         premium: { <br>           total: 900, <br>         } |

Each update from the example above includes a bound attribute that indicates that the corresponding update is immutable or cannot be changed, a transaction date attribute (e.g., ts) that indicates when the update was entered into the object model, the effective date attribute (e.g., effective-_date) that indicates an effective date for the policy for the data set forth in the update. Examples of data (to be updated)

include property reconstruction estimate (e.g., rce), coverage limit (e.g., cov_a), and policy premium. The transaction data attribute is also referred to as a timestamp attribute.

The object view model 204 enables a user to access a snapshot of the object at a specific point in time. In one example, the object view model 204 reconstruct a final version of the object by iteratively projecting the values of the attributes for each update into the final version of the object.

For example, the object database model 206 generates a view of the object with the attribute values corresponding to the specific point in time that is specified in a query from an administrator (e.g., a user of the product system 128/database update system 130). In another example embodiment, the object database model 206 produces a latest version of the object with the corresponding attribute values. As such, the object database model 206 enables a user to track a state of object. In one example, the object may represent attributes of a product (e.g., physical product specification, insurance policy, agreement, etc.). In the example of the insurance policy, an administrator of the product system 128 uses the object database model 206 to retrieve a latest state of the insurance policy (e.g., policy is active, coverage is $100,000). In another example, the administrator uses the object database model 206 to retrieve a state of the insurance policy at a specified point in time (e.g., policy had a coverage of $80,000 on date D).

The following pseudo-code illustrates an example of updates to a policy object:

```
// Policy View Model policyInfo = policy.getPolicyInfo( );
policyInfo: {
    data: {
        cov_a: 75000,
        discount 1: false,
        discount 2: true,
        property_data: {
            address: {
                city,
            },
            rce: 50000,
        },
        cc_token: 'abc',
    }
}
```

The update engine 202 enables an administrator to update the object (for the update to be effective at a future date, at a present time, or retroactively). Because the object may be multidimensional and be subject to certain rules. For example, the value of one attribute may depend on the value of another attribute. As such, the update engine 202 verifies that the changed value in one attribute is valid based on the relationship between the attributes and their corresponding values, prior to generating/committing the update to the object. For example, the value of one attribute cannot exceed 1.5 times the value of another attribute.

In one example embodiment, the update engine 202 includes a new transaction module 208, an update transaction module 210, and a persist module 212. The new transaction module 208 detects that the administration is submitting a new update entry. In response, the new transaction module 208 generates a new transaction field for the object. The new transaction field includes the effective date but does not identify what other attributes of the object are to be updated.

The following pseudo-code illustrates an example of a new transaction field:

```
start new transaction
{
    effective _date: 240,
}
```

The update transaction module 210 generates an update for the object based on the new transaction and validates the updates. An example operation of the update transaction module 210 is described below with respect to FIG. 3.

The persist module 212 binds or commits the update to the object. In one example, the persist module 212 adds the update to the object and specifies that the update is immutable. The object view model 204 may construct a latest version of the object based on all the updates in the object.

Figure 3:
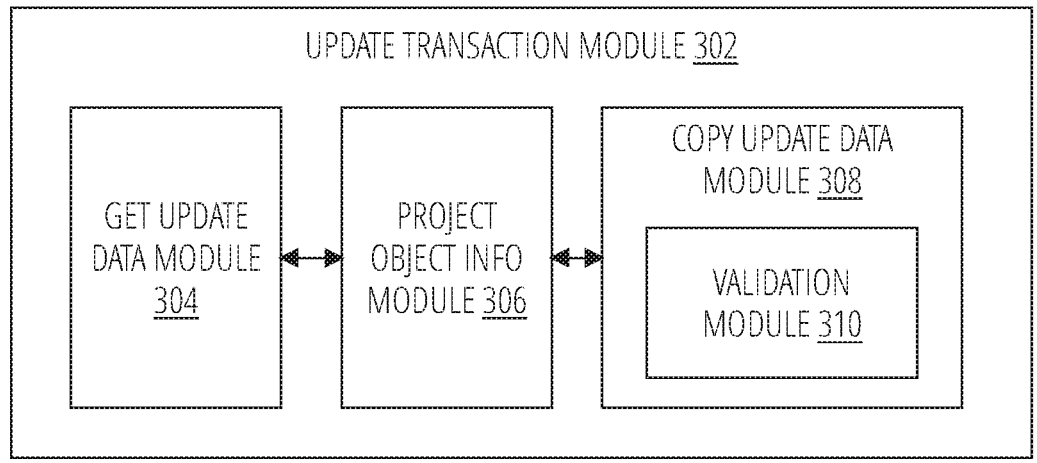
FIG. 3 illustrates an update transaction module in accordance with one example embodiment.

FIG. 3 illustrates an update transaction module 302 in accordance with one example embodiment. The update transaction module 302 includes a get update data module 304, a project object info module 306, and a copy update data module 308.

The get update data module 304 retrieves the new value of an attribute of the object. For example, the new value of a reconstruction estimate has decreased to $50.000.

The project object info module 306 communicates with the object view model 204 to project the object based on the current updates and the new value in the new update).

The copy update data module 308 validates the new value of the update. For example, the copy update data module 308 accesses a rule definition or database and values of other attributes of the object to determine the validity of the new value. In one example, the rule definition describes that the value of attribute A has to be at least two times greater than the value of attribute B.

In one example embodiment, the copy update data module 308 includes a validation module 310 that performs the validation of the new entry (e.g., new value of an attribute) based on the rule definition. If the validation module 310 cannot validate the new value of an attribute in the update, the copy update data module 308 generates an error notification indicating that the new value does not confirm with the rule definition.

If the validation module 310 validates the new value of an attribute in the update, the copy update data module 308, the copy update data module 308 updates the object with the new value (e.g., adjusting a coverage value) and persist the object to the databases 124.

Figure 4:
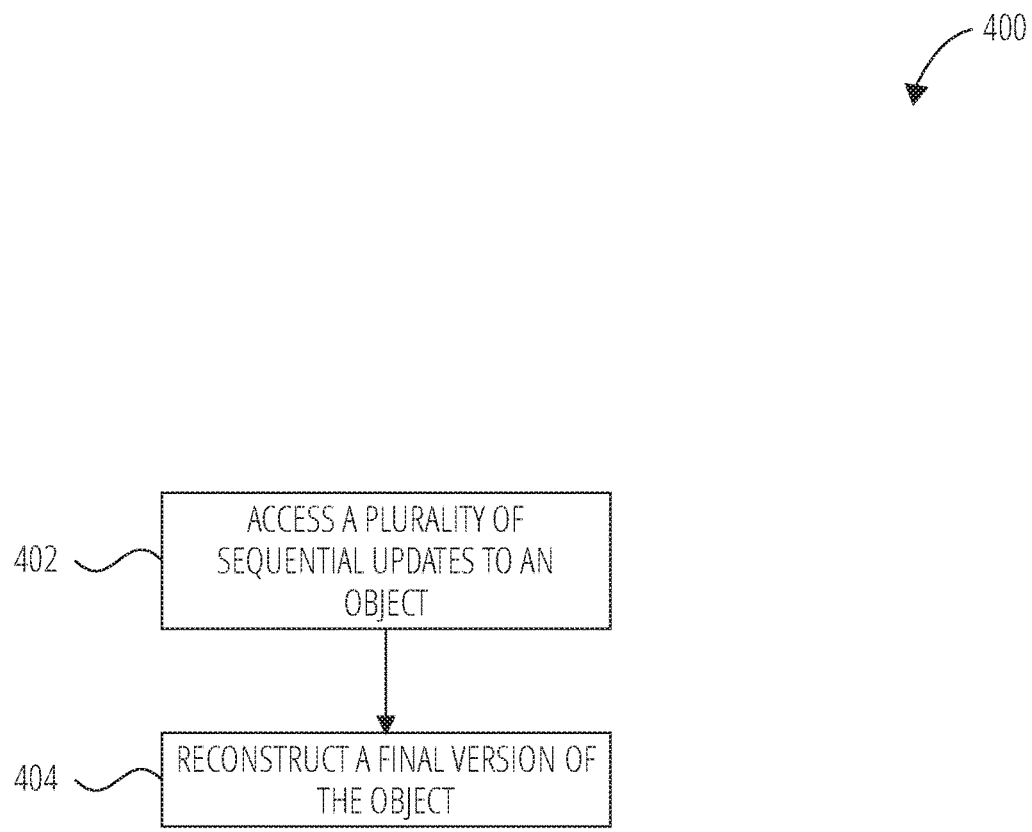
FIG. 4 is a flow diagram illustrating a method for reconstructing a final version of an object in accordance with one example embodiment.

FIG. 4 is a flow diagram illustrating a method for reconstructing a final version of an object in accordance with one example embodiment. Operations in the method 400 may be performed by the database update system 130, using components (e.g., modules, engines) described above with respect to FIG. 2 and FIG. 3. Accordingly, the method 400 is described by way of example with reference to the database update system 130. However, it shall be appreciated that at least some of the operations of the method 400 may be deployed on various other hardware configurations or be performed by similar components residing elsewhere. For example, some of the operations may be performed at the client device 106 or at the third-party server 112.

At block 402, the object database model 206 accesses a sequence of updates to an object. For example, each update indicates a field of change (e.g., value change of an identified attribute, identified attribute, transaction date, and effective date).

At block 404, the object view model 204 reconstructs a final version of the object based on the updates. The object view model 204 enables a user to access a snapshot of the object at a specific point in time. In one example, the object view model 204 reconstruct a final version of the object by iteratively projecting the values of the attributes for each update into the final version of the object.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 5:
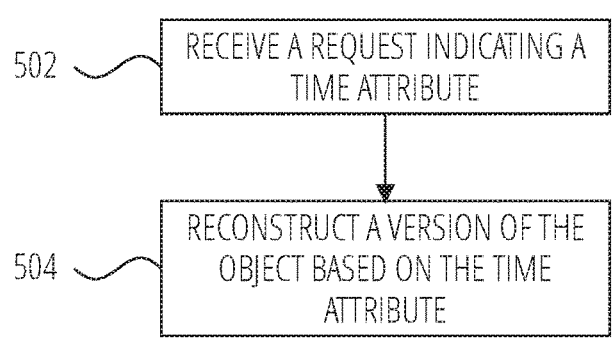
FIG. 5 is a flow diagram illustrating a method for reconstructing a version of an object in accordance with one example embodiment.

FIG. 5 is a flow diagram illustrating a method for reconstructing a version of an object in accordance with one example embodiment. Operations in the method 500 may be performed by the database update system 130, using components (e.g., modules, engines) described above with respect to FIG. 2 and FIG. 3. Accordingly, the method 500 is described by way of example with reference to the database update system 130. However, it shall be appreciated that at least some of the operations of the method 500 may be deployed on various other hardware configurations or be performed by similar components residing elsewhere. For example, some of the operations may be performed at the client device 106 or at the third-party server 112.

At block 502, the object view model 204 receives a query for the status or version of the object. The query indicates a time attribute (e.g., effective date xx).

At block 504, the object view model 204 reconstructs a version of the object based on the updates and the time attribute. For example, the object view model 204 enables a user to access a snapshot of the object at the time specified in the query. In one example, the object view model 204 reconstruct a version of the object by iteratively projecting the values of the attributes for each update up to the specified time into the version of the object.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
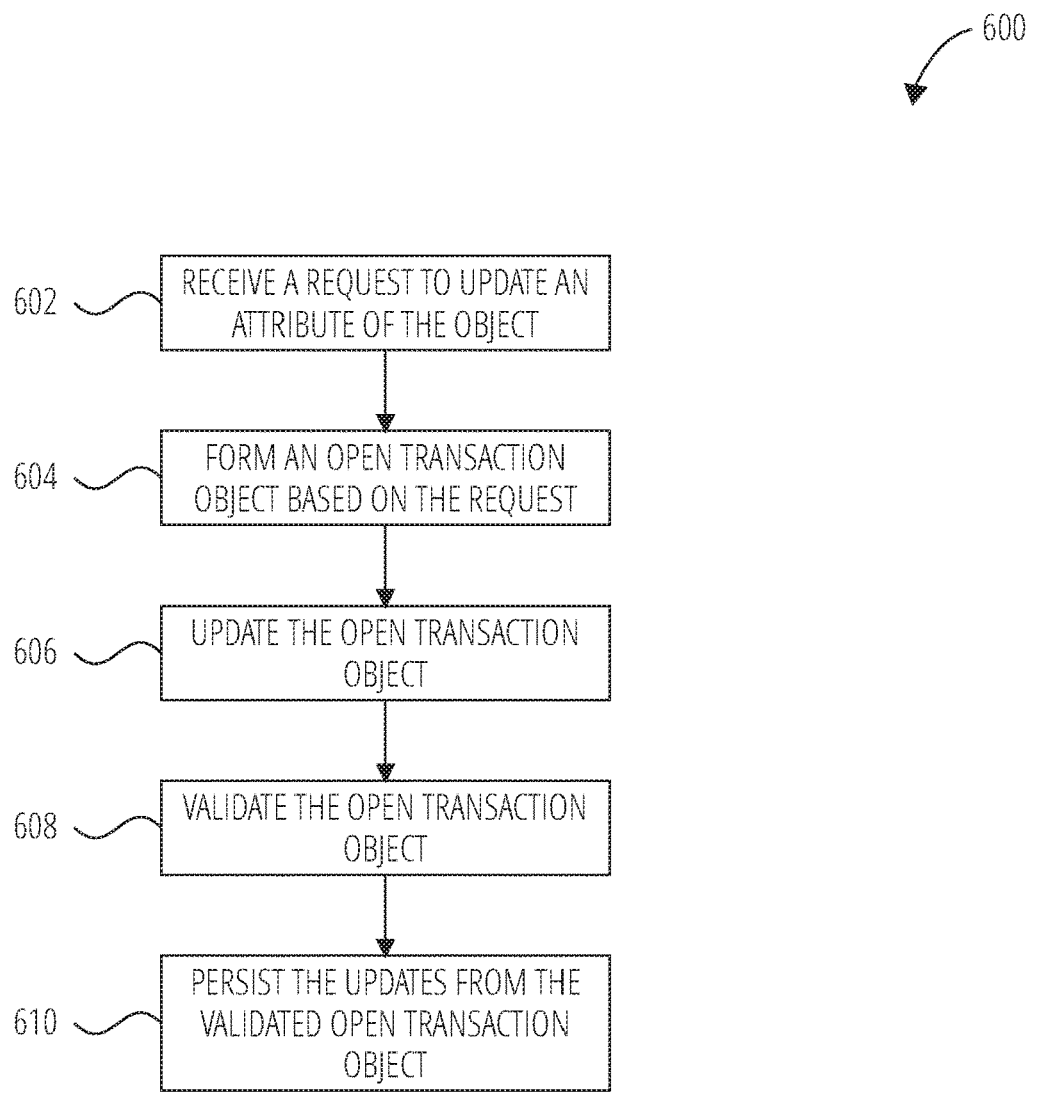
FIG. 6 is a flow diagram illustrating a method for updating an object with one example embodiment.

FIG. 6 is a flow diagram illustrating a method for updating an object with one example embodiment. Operations in the method 600 may be performed by the database update system 130, using components (e.g., modules, engines) described above with respect to FIG. 2 and FIG. 3. Accordingly, the method 600 is described by way of example with reference to the database update system 130. However, it shall be appreciated that at least some of the operations of the method 600 may be deployed on various other hardware configurations or be performed by similar components residing elsewhere. For example, some of the operations may be performed at the client device 106 or at the third-party server 112.

At block 602, the new transaction module 208 receives a request to update an attribute of the object.

At block 604, the update transaction module 210 forms an open transaction object based on the request.

At block 606, the update transaction module 210 updates the open transaction object based on the new value;

At block 608, the update transaction module 210 validates the new value in the open transaction object.

At block 610, the persist module 212 persists the updates from the validated open transaction object to the databases 124.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
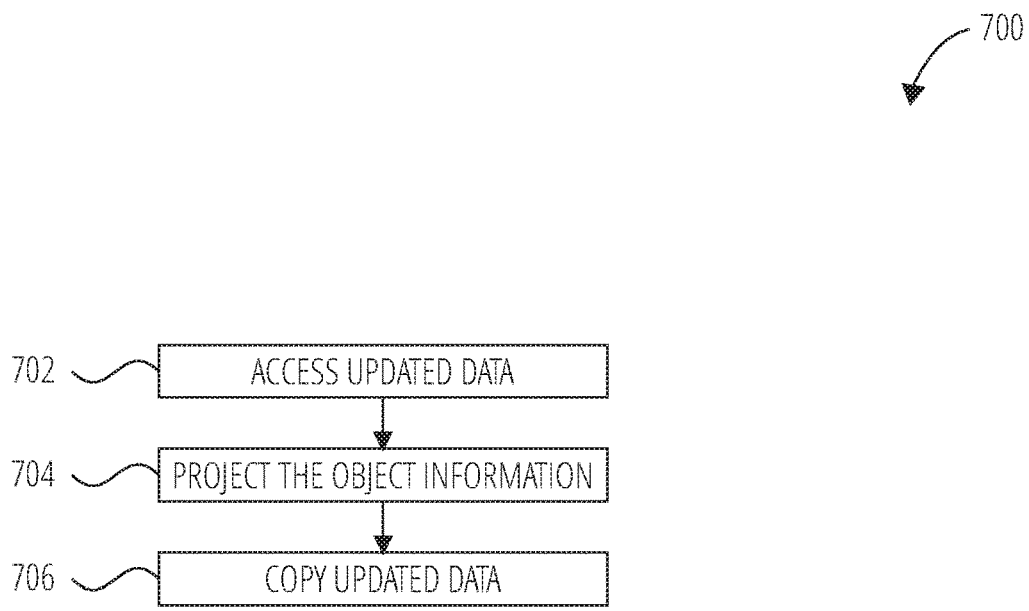
FIG. 7 is a flow diagram illustrating a method for copying an updated data in accordance with one example embodiment.

FIG. 7 is a flow diagram illustrating a method for copying an updated data in accordance with one example embodiment. The method 700 may be performed by one or more computational devices, as described below. Operations in the method 700 may be performed by the database update system 130, using components (e.g., modules, engines) described above with respect to FIG. 2 and FIG. 3. Accordingly, the method 700 is described by way of example with reference to the database update system 130. However, it shall be appreciated that at least some of the operations of the method 700 may be deployed on various other hardware configurations or be performed by similar components residing elsewhere. For example, some of the operations may be performed at the client device 106 or at the third-party server 112.

At block 702, the get update data module 304 accesses the updated data from the request.

At block 704, the project object info module 306 projects the object information based on the updates to form a version of the object.

At block 706, the copy update data module 308 copies the updated data once the updated data is validated by the validation module 310.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
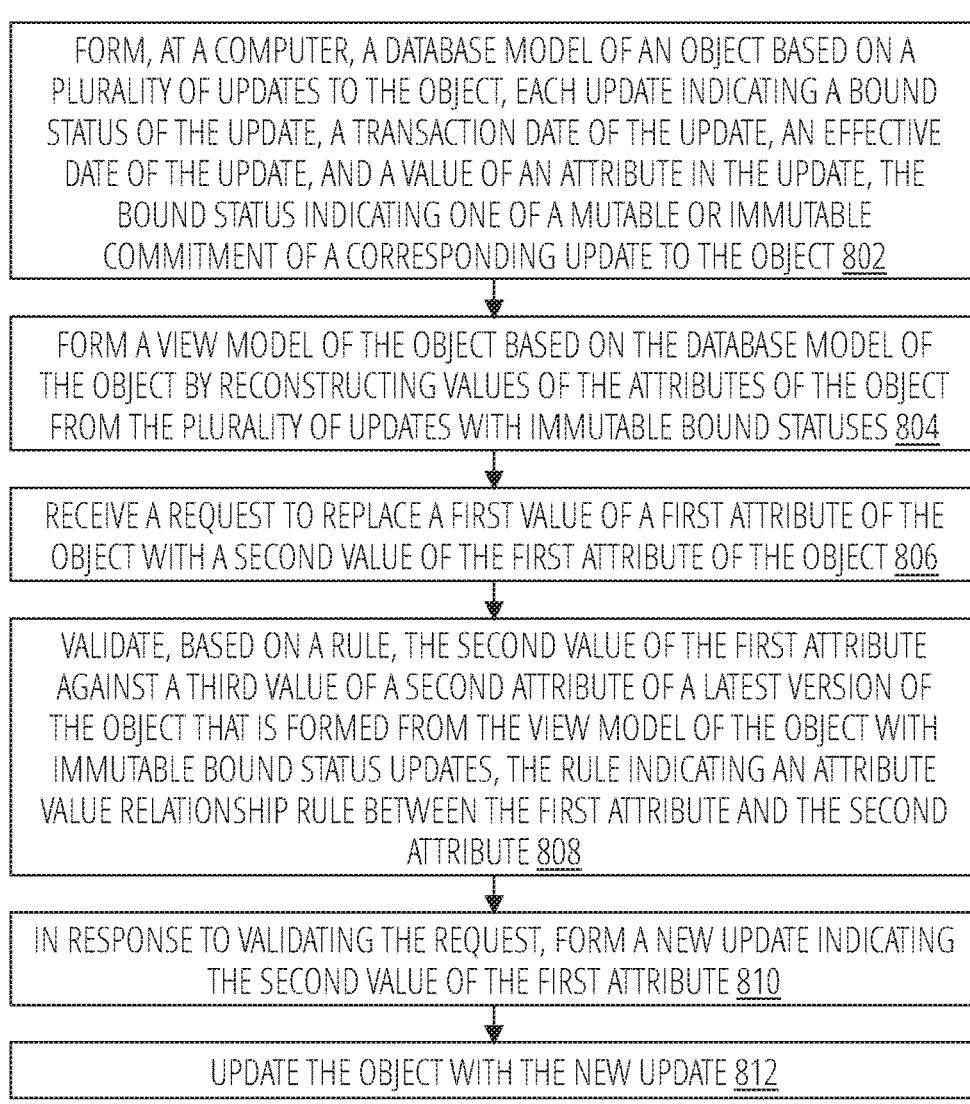
FIG. 8 illustrates a routine 800 in accordance with one embodiment.

FIG. 8 illustrates a routine 800 in accordance with one embodiment. In block 802, routine 800 forms, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object. In block 804, routine 800 forms a view model of the object based on the database model of the object by reconstructing values of the attributes of the object from the plurality of updates with immutable bound statuses. In block 806, routine 800 receives a request to replace a first value of a first attribute of the object with a second value of the first attribute of the object. In block 808, routine 800 validates, based on a rule, the second value of the first attribute against a third value of a second attribute of a latest version of the object that is formed from the view model of the object with immutable bound status updates, the rule indicating an attribute value relationship rule between the first attribute and the second attribute. In block 810, routine 800 in response to validating the request, forms a new update indicating the second value of the first attribute. In block 812, routine 800 updates the object with the new update.

Figure 9:
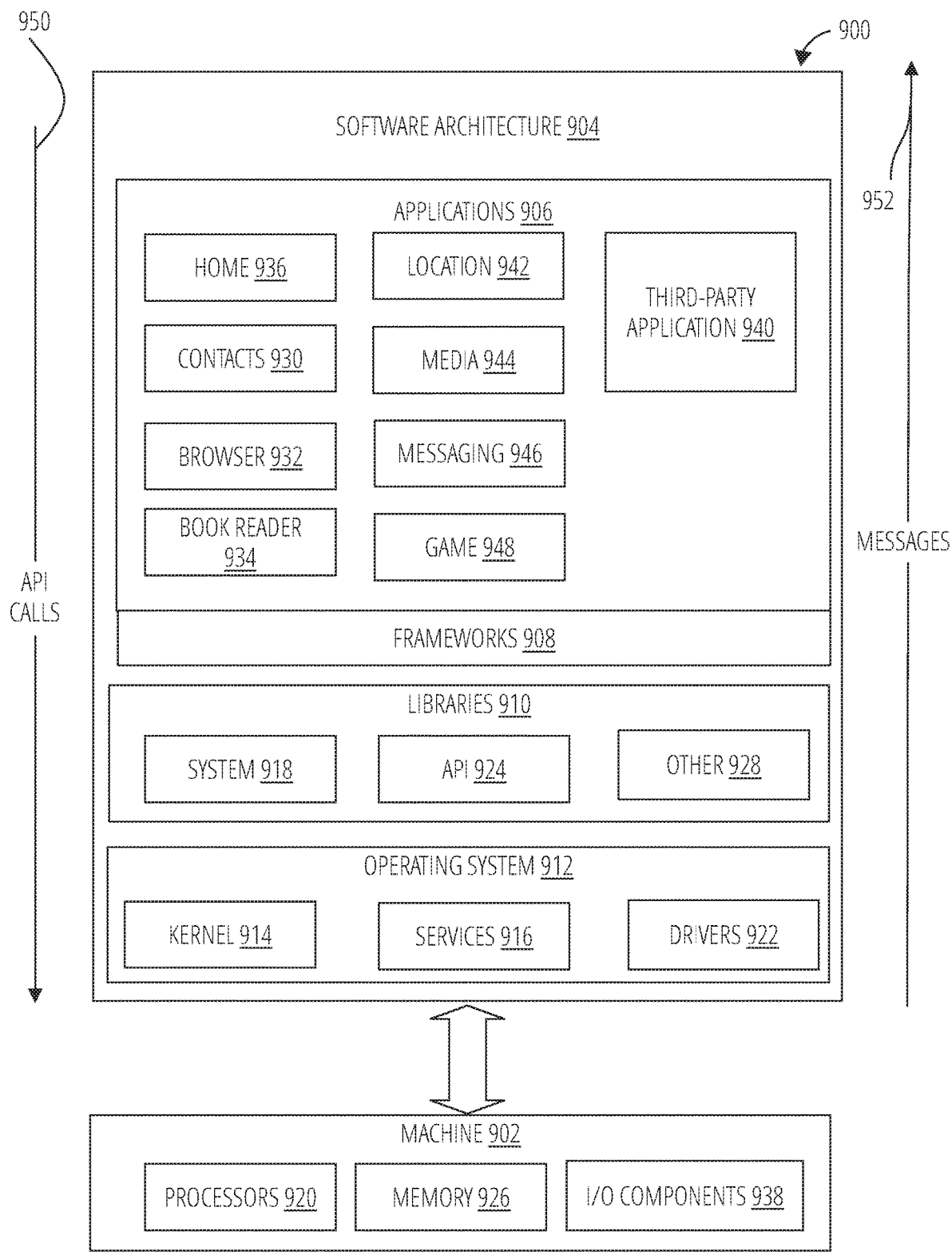
FIG. 9 is block diagram showing a software architecture within which the present disclosure may be implemented, according to an example embodiment.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers). WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Figure 10:
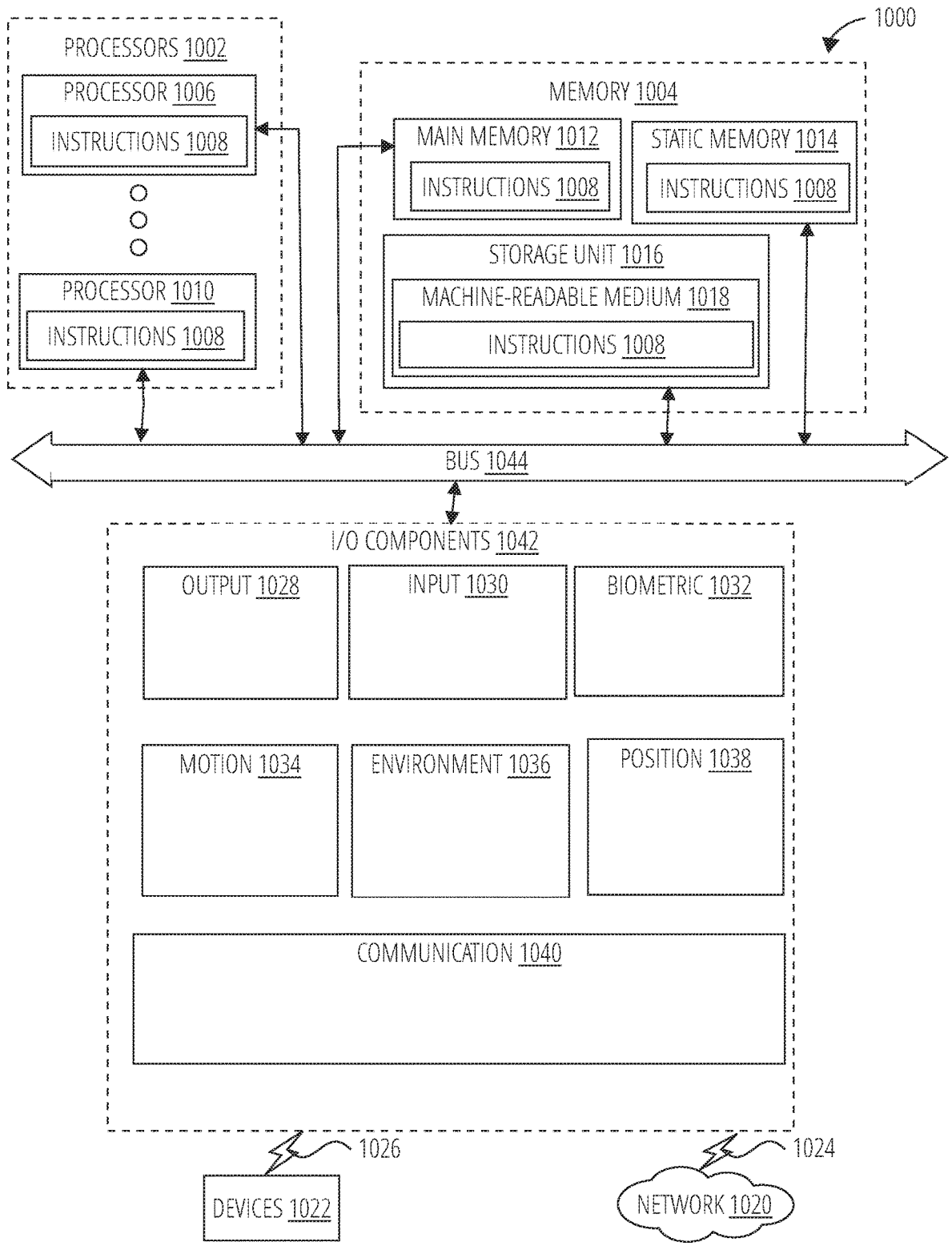
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph, MaxiCode. PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method comprising: forming, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object; forming a view model of the object based on the database model of the object by reconstructing values of the attributes of the object from the plurality of updates with immutable bound statuses; receiving a request to replace a first value of a first attribute of the object with a second value of the first attribute of the object; validating, based on a rule, the second value of the first attribute against a third value of a second attribute of a latest version of the object that is formed from the view model of the object with immutable bound status updates, the rule indicating an attribute value relationship rule between the first attribute and the second attribute; in response to validating the request, forming a new update indicating the second value of the first attribute; and updating the object with the new update.

Example 2 includes example 1, further comprising: receiving a query date; and using the view model of the object to project the values of the attributes of the object based on the query date and reconstruct the values of the attributes of the object for the query date.

Example 3 includes example 2, wherein the object comprises a plurality of multi-dimensional nested objects, a first attribute of a first nested object being dependent on a second attribute of a second nested object.

Example 4 includes example 1, wherein the transaction date of a first update indicates a date of the request of the first update received by the computer, wherein the effective date of the update indicates a date when the first update is to take effect.

Example 5 includes example 1, further comprising: forming an open transaction object, the open transaction indicating a first effective date and a mutable bound status; updating and validating one or more attributes of the open transaction object; in response to updating and validating the one or more attributes, persisting the updated attributes of the open transaction to the object; and closing the open transaction object.

Example 6 includes example 5, wherein forming the open transaction object comprises: retrieving the second value of the first attribute of the object; projecting values of the attributes from the updates of the object to reconstruct the values of the attributes of the object for the first effective date; and copying the second value of the first attribute to the first attribute of the object.

Example 7 includes example 6, wherein validating one or more attributes of the open transaction object further comprises: validating the object after copying the second value to the first attribute of the object; in response to the validating, determining an error for the second value; and generating a graphical user interface that indicates the second value is invalid.

Example 8 includes example 6, wherein validating one or more attributes of the open transaction object further comprises: validating the object after copying the second value to the first attribute of the object in the open transaction; and in response to the validating, copying the second value of the first attribute to the new update.

Example 9 includes example 6, wherein validating one or more attributes of the open transaction object further comprises: validating the object after copying the second value to the first attribute of the object in the open transaction; verifying that the open transaction indicates the first effective date and the mutable bound status; and in response to the validating and verifying, copying the second value of the first attribute and a first effective date of the effective date attribute indicating the first effective date of the second value to the new update.

Example 10 includes example 1, wherein updating the object with the new update further comprises: forming the new update in the database model of the object, the new update indicating the second value of the first attribute, the first effective date of the effective date attribute for the second value of the first attribute of the object, and an immutable bound status.

Example 11 is a computing apparatus comprising: a processor; and a memory storing instructions that, when executed by the processor, configure the apparatus to: form, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object; form a view model of the object based on the database model of the object by reconstructing values of the attributes of the object from the plurality of updates with immutable bound statuses; receive a request to replace a first value of a first attribute of the object with a second value of the first attribute of the object; validate, based on a rule, the second value of the first attribute against a third value of a second attribute of a latest version of the object that is formed from the view model of the object with immutable bound status updates, the rule indicating an attribute value relationship rule between the first attribute and the second attribute; in response to validating the request, form a new update indicating the second value of the first attribute; and update the object with the new update.

Example 12 is a non-transitory computer-readable storage medium, the computer-readable storage medium including instructions that when executed by a computer, cause the computer to: form, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object; form a view model of the object based on the database model of the object by reconstructing values of the attributes of the object from the plurality of updates with immutable bound statuses; receive a request to replace a first value of a first attribute of the object with a second value of the first attribute of the object; validate, based on a rule, the second value of the first attribute against a third value of a second attribute of a latest version of the object that is formed from the view model of the object with immutable bound status updates, the rule indicating an attribute value relationship rule between the first attribute and the second attribute; in response to validating the request, form a new update indicating the second value of the first attribute; and update the object with the new update.

What is claimed is:

1. A computer-implemented method comprising:
    forming, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object;
    identifying immutable bound statuses in the plurality of updates;
    reconstructing values of the attributes of the object from the plurality of updates having identified immutable bound statuses;
    forming a view model of the object based on the reconstructed values of the attributes of the object;
    receiving a request to replace a first value of a first attribute of the object with a second value of the first attribute of the object;
    validating, based on a rule, the second value of the first attribute against a third value of a second attribute of a latest version of the object that is formed from the view model of the object with immutable bound status updates, the rule indicating an attribute value relationship rule between the first attribute and the second attribute;
    in response to validating the request, forming a new update indicating the second value of the first attribute;
    updating the object with the new update;
    receiving, from a client device, a query date of the updated object;
    in response to receiving the query date of the updated object, reconstructing the values of the attributes of the updated object for the query date using the view model of the updated object, wherein the reconstructed values of the attributes of the updated object depend on the values of attributes of a second object that is external to the view model of the object; and
    providing, to the client device, the reconstructed values of the attributes of the updated object.

2. The computer-implemented method of claim 1, wherein reconstructing the values of the attributes of the updated object for the query date comprises projecting the values of the attributes of the updated object based on the query date using the view model of the updated object.

3. The computer-implemented method of claim 2, wherein the object comprises a plurality of multi-dimensional nested objects, a first attribute of a first nested object being dependent on a second attribute of a second nested object.

4. The computer-implemented method of claim 1, wherein the transaction date of a first update indicates a date of the request of the first update received by the computer, wherein the effective date of the update indicates a date when the first update is to take effect.

5. The computer-implemented method of claim 1, further comprising:
    forming an open transaction object, the open transaction indicating a first effective date and a mutable bound status;
    updating and validating one or more attributes of the open transaction object;
    in response to updating and validating the one or more attributes, persisting the updated attributes of the open transaction to the object; and
    closing the open transaction object.

6. The computer-implemented method of claim 5, wherein forming the open transaction object comprises:
    retrieving the second value of the first attribute of the object;
    projecting values of the attributes from the updates of the object to reconstruct the values of the attributes of the object for the first effective date; and
    copying the second value of the first attribute to the first attribute of the object.

7. The computer-implemented method of claim 6, wherein validating one or more attributes of the open transaction object further comprises:
    validating the object after copying the second value to the first attribute of the object,
    in response to the validating, determining an error for the second value; and
    generating a graphical user interface that indicates the second value is invalid.

8. The computer-implemented method of claim 6, wherein validating one or more attributes of the open transaction object further comprises:
    validating the object after copying the second value to the first attribute of the object in the open transaction; and in response to the validating, copying the second value of the first attribute to the new update.

9. The computer-implemented method of claim 6, wherein validating one or more attributes of the open transaction object further comprises:
validating the object after copying the second value to the first attribute of the object in the open transaction;
verifying that the open transaction indicates the first effective date and the mutable bound status; and
in response to the validating and verifying, copying the second value of the first attribute and a first effective date of the effective date attribute indicating the first effective date of the second value to the new update.

10. The computer-implemented method of claim 1, wherein updating the object with the new update further comprises:
forming the new update in the database model of the object, the new update indicating the second value of the first attribute, the first effective date of the effective date attribute for the second value of the first attribute of the object, and an immutable bound status.

11. A computing apparatus comprising:
a processor; and
a memory storing instructions that, when executed by the processor, configure the apparatus to:
form, at a computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object;
identify immutable bound statuses in the plurality of updates;
reconstruct values of the attributes of the object from the plurality of updates having identified immutable bound statuses;
form a view model of the object based on the reconstructed values of the attributes of the object;
receive a request to replace a first value of a first attribute of the object with a second value of the first attribute of the object;
validate, based on a rule, the second value of the first attribute against a third value of a second attribute of a latest version of the object that is formed from the view model of the object with immutable bound status updates, the rule indicating an attribute value relationship rule between the first attribute and the second attribute;
in response to validating the request, forming a new update indicating the second value of the first attribute;
update the object with the new update;
receive, from a client device, a query date of the updated object;
in response to receiving the query date of the updated object, reconstructing the values of the attributes of the updated object for the query date using the view model of the updated object, wherein the reconstructed values of the attributes of the updated object depend on the values of attributes of a second object that is external to the view model of the object; and
provide, to the client device, the reconstructed values of the attributes of the updated object.

12. The computing apparatus of claim 11, wherein wherein reconstructing the values of the attributes of the updated object for the query date comprises projecting the values of the attributes of the updated object based on the query date using the view model of the updated object.

13. The computing apparatus of claim 12, wherein the object comprises a plurality of multi-dimensional nested objects, a first attribute of a first nested object being dependent on a second attribute of a second nested object.

14. The computing apparatus of claim 11, wherein the transaction date of a first update indicates a date of the request of the first update received by the computer, wherein the effective date of the update indicates a date when the first update is to take effect.

15. The computing apparatus of claim 11, wherein the instructions further configure the apparatus to:
form an open transaction object, the open transaction indicating a first effective date and a mutable bound status;
update and validate one or more attributes of the open transaction object;
in response to updating and validate the one or more attributes, persisting the updated attributes of the open transaction to the object; and
close the open transaction object.

16. The computing apparatus of claim 15, wherein forming the open transaction object comprises:
retrieve the second value of the first attribute of the object;
project values of the attributes from the updates of the object to reconstruct the values of the attributes of the object for the first effective date; and
copy the second value of the first attribute to the first attribute of the object.

17. The computing apparatus of claim 16, wherein validating one or more attributes of the open transaction object further comprises:
validate the object after copying the second value to the first attribute of the object;
in response to the validating, determine an error for the second value; and
generate a graphical user interface that indicates the second value is invalid.

18. The computing apparatus of claim 16, wherein validating one or more attributes of the open transaction object further comprises:
validate the object after copying the second value to the first attribute of the object in the open transaction; and
in response to the validating, copy the second value of the first attribute to the new update.

19. The computing apparatus of claim 16, wherein validating one or more attributes of the open transaction object further comprises:
validate the object after copying the second value to the first attribute of the object in the open transaction;
verify that the open transaction indicates the first effective date and the mutable bound status; and
in response to the validating and verify, copying the second value of the first attribute and a first effective date of the effective date attribute indicating the first effective date of the second value to the new update.

20. A non-transitory computer-readable storage medium, the computer-readable storage medium including instructions that when executed by a computer, cause the computer to:
form, at a computer, a database model of an object based on a plurality of updates to the object, each update indicating a bound status of the update, a transaction date of the update, an effective date of the update, and a value of an attribute in the update, the bound status indicating on of a mutable or immutable commitment of a corresponding update to the object;

identify immutable bound statuses in the plurality of updates;

reconstruct values of the attributes of the object from the plurality of updates having identified immutable bound statuses;

form a view model of the object based on the reconstructed values of the attributes of the object;

receive a request to replace a first value of a first attribute of the object with a second value of the first attribute of the object:

validate, based on a rule, the second value of the first attribute against a third value of a second attribute of a latest version of the object that is formed from the view model of the object with immutable bound status updates, the rule indicating an attribute value relationship rule between the first attribute and the second attribute;

in response to validating the request, forming a new update indicating the second value of the first attribute;

update the object with the new update;

receive, from a client device, a query date of the updated object;

in response to receiving the query date of the updated object, reconstructing the values of the attributes of the updated object for the query date using the view model of the updated object, wherein the reconstructed values of the attributes of the updated object depend on the values of attributes of a second object that is external to the view model of the object; and provide, to the client device, the reconstructed values of the attributes of the updated object.

* * * * *

UNITED STATES PATENT AND TRADEMARK OFFICE
CERTIFICATE OF CORRECTION

PATENT NO. : 11,687,517 B2
APPLICATION NO. : 17/069503
DATED : June 27, 2023
INVENTOR(S) : Adrian Olainu It is certified that error appears in the above-identified patent and that said Letters Patent is hereby corrected as shown below:

In the Claims

In Column 16, Line 58, in Claim 7, delete "object," and insert --object;-- therefor In Column 17, Line 65, in Claim 12, after "claim 11,", delete "wherein"

In Column 19, Line 1, in Claim 20, delete "on" and insert --one-- therefor

In Column 19, Line 13, in Claim 20, delete "object:" and insert --object;-- therefor Signed and Sealed this
Twenty-fifth Day of July, 2023

Katherine Kelly Vidal
*Director of the United States Patent and Trademark Office*